(12) United States Patent
Pelzl et al.

(10) Patent No.: US 7,761,635 B1
(45) Date of Patent: Jul. 20, 2010

(54) BRIDGE DEVICE ACCESS SYSTEM

(75) Inventors: Paul J. Pelzl, Waukesha, WI (US); Robert C. Botchek, Brookfield, WI (US)

(73) Assignee: Tableau, LLC, Waukesha, WI (US)

(*) Notice: Subject to any disclaimer, the term of this patent is extended or adjusted under 35 U.S.C. 154(b) by 194 days.

(21) Appl. No.: 12/143,677

(22) Filed: Jun. 20, 2008

(51) Int. Cl.
G06F 12/14 (2006.01)

(52) U.S. Cl. ........................ 710/200; 710/311

(58) Field of Classification Search ......... 710/306–315, 710/200
See application file for complete search history.

(56) References Cited

U.S. PATENT DOCUMENTS

| | | | | |
|---|---|---|---|---|
| 4,783,745 A | * | 11/1988 | Brookner et al. | 705/410 |
| 4,974,153 A | * | 11/1990 | Pimm et al. | 710/306 |
| 6,216,193 B1 | * | 4/2001 | Lai et al. | 710/308 |
| 6,219,724 B1 | * | 4/2001 | Kim et al. | 710/22 |
| 6,226,749 B1 | * | 5/2001 | Carloganu et al. | 726/2 |
| 6,366,977 B1 | * | 4/2002 | Mizoguchi | 711/103 |
| 6,392,925 B2 | * | 5/2002 | Jha et al. | 365/185.04 |
| 6,629,184 B1 | * | 9/2003 | Berg et al. | 710/306 |
| 6,681,304 B1 | * | 1/2004 | Vogt et al. | 711/164 |
| 7,085,386 B2 | * | 8/2006 | Audebert et al. | 380/281 |
| 7,360,049 B2 | * | 4/2008 | Ishida | 711/164 |
| 7,487,372 B2 | | 2/2009 | Botchek | |
| 2008/0052429 A1 | | 2/2008 | Botchek | |
| 2008/0052490 A1 | | 2/2008 | Botchek | |
| 2008/0052525 A1 | | 2/2008 | Botchek | |
| 2008/0126472 A1 | | 5/2008 | Botchek | |
| 2009/0113155 A1 | * | 4/2009 | Beals | 711/164 |
| 2009/0125725 A1 | * | 5/2009 | Kim | 713/184 |

OTHER PUBLICATIONS

Western Digital ATA 6 DCO Concerns Feb. 15, 2001.*

* cited by examiner

*Primary Examiner*—Paul R Myers
(74) *Attorney, Agent, or Firm*—Reinhart Boerner Van Deuren P.C.

(57) ABSTRACT

A bridge device access system permits access to a locked bridge device coupled between a host and a storage device. The bridge device is unlocked by sending an unlock sequence of storage device verify commands from the host to the bridge device. Each verify command includes a start address and a length parameter, wherein the sequence of start addresses in the sequence of storage device verify commands is a pseudo-random sequence of hexadecimal values. The bridge device detects the unlock sequence and is unlocked. The host can send a bridge-access command as the first command after the unlock sequence. Bridge-access commands can include storage device commands that are interpreted by the bridge device as queries and/or instructions for performing various tasks. The bridge device processes the bridge-access command, performing a prescribed operation in response to the bridge-access command, and then immediately re-enters its locked state.

16 Claims, 7 Drawing Sheets

Table 1 - Exemplary Verify Commands and Unlock Sequence

| Command Number | Start Address (hex) |
|---|---|
| 1 | BB |
| 2 | 6D |
| 3 | 7E |
| 4 | 52 |
| 5 | 30 |
| 6 | 07 |
| 7 | FB |
| 8 | 6A |
| 9 | 74 |
| 10 | 57 |
| 11 | F5 |
| 12 | 45 |
| 13 | C2 |
| 14 | 0A |
| 15 | F8 |
| 16 | 06 |
| 17 | FF |
| 18 | 78 |
| 19 | E1 |
| 20 | 30 |

*Figure 4*

Table 2 - VERIFY (10) Command Descriptor Block for Issuing Unlock Sequence

| Byte \ Bit | 7 | 6 | 5 | 4 | 3 | 2 | 1 | 0 |
|---|---|---|---|---|---|---|---|---|
| 0 | colspan=8 | OPERATION CODE (2Fh) |
| 1 | colspan=8 | VERIFY (10) MODE FLAGS (00h) |
| 2 | (MSB) | | | | | | | |
| 3 | colspan=8 | LOGICAL BLOCK ADDRESS (start address) |
| 4 | | | | | | | | |
| 5 | | | | | | | | (LSB) |
| 6 | colspan=8 | RESERVED (00h) |
| 7 | colspan=8 | VERIFICATION LENGTH MSB (00h) |
| 8 | colspan=8 | VERIFICATION LENGTH LSB (01h) |
| 9 | colspan=8 | CONTROL (00h) |

Table 3 - READ (10) Command Descriptor Block for Issuing Bridge Query

| Byte \ Bit | 7 | 6 | 5 | 4 | 3 | 2 | 1 | 0 |
|---|---|---|---|---|---|---|---|---|
| 0 | colspan=8 | OPERATION CODE (28h) |
| 1 | colspan=8 | READ (10) MODE FLAGS (00h) |
| 2 | colspan=8 | LOGICAL BLOCK ADDRESS MSBs (00h) |
| 3 | | | | | | | | |
| 4 | | | | | | | | |
| 5 | colspan=8 | LOGICAL BLOCK ADDRESS LSB (ECh) |
| 6 | colspan=8 | RESERVED (00h) |
| 7 | colspan=8 | TRANSFER LENGTH MSB (00h) |
| 8 | colspan=8 | TRANSFER LENGTH LSB (01h) |
| 9 | colspan=8 | CONTROL (00h) |

*Figure 5*

Table 4 - Bridge Query Response Header Format

| Byte \ Bit | 7 | 6 | 5 | 4 | 3 | 2 | 1 | 0 |
|---|---|---|---|---|---|---|---|---|
| 0 | RESERVED ||||||||
| 1 | AVAILABLE RESPONSE LENGTH ||||||||
| 2 | (MSB) | RESPONSE SIGNATURE |||||||
| 3 | | | | | | | | (LSB) |
| 4 | RESERVED ||||||||
| 5 | FIRMWARE STEPPING ||||||||
| 6 | CHANNEL INDEX |||| CHANNEL TYPE ||||
| 7 | RESERVED |||| DECERR | DECRO | RW | DBG |
| 8 | (MSB) |||||||
| 9 | BRIDGE SERIAL NUMBER ||||||||
| 10 | ||||||||
| 11 | ||||||||
| 12 | ||||||||
| 13 | ||||||||
| 14 | ||||||||
| 15 | | | | | | | | (LSB) |
| 16-23 | BRIDGE VENDOR ||||||||
| 24-31 | BRIDGE MODEL ||||||||
| 32-43 | FIRMWARE BUILD DATE ||||||||
| 44-55 | FIRMWARE BUILD TIME ||||||||
| 56-63 | DRIVE VENDOR ||||||||
| 64-91 | DRIVE MODEL ||||||||
| 92-111 | DRIVE SERIAL NUMBER ||||||||
| 112-119 | DRIVE REVISION ||||||||

*Figure 6*

Table 5 - Bridge Query HPA/DCO Response Page Format

| Byte \ Bit | 7 | 6 | 5 | 4 | 3 | 2 | 1 | 0 |
|---|---|---|---|---|---|---|---|---|
| 0 | PAGE ID ||||||||
| 1 | PAGE LENGTH ||||||||
| 2 | RESERVED ||| SECUSE | SECSUP | DCOUSE | DCOSUP | HPAUSE | HPASUP |
| 3-7 | RESERVED ||||||||
| 8 | (MSB) |||||||  |
| 9 | REPORTED CAPACITY ||||||||
| 10 |  |||||||  |
| 11 |  ||||||| (LSB) |
| 12-15 | RESERVED ||||||||
| 16 | (MSB) |||||||  |
| 17 | HPA CAPACITY ||||||||
| 18 |  |||||||  |
| 19 |  ||||||| (LSB) |
| 20-23 | RESERVED ||||||||
| 24 | (MSB) |||||||  |
| 25 | DCO CAPACITY ||||||||
| 26 |  |||||||  |
| 27 |  ||||||| (LSB) |
| 28-31 | RESERVED ||||||||

BRIDGE DEVICE ACCESS SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

The present invention relates generally to communications between a host computer and a command-filtering bridge device or the like interposed between the host computer and a storage device.

2. Description of Related Art

Bridge devices can be interposed between a host computer and a storage device to perform various functions. One specialized type of bridge device works with an expander that provides an interface to a plurality of host computers, an interface to a single-ported storage drive and arbitration logic. The bridge device's arbitration logic controls and permits concurrent access by the hosts to the single-ported storage drive so that the bridge need not store read or write data being received from or provided to the storage drive.

Another specialized type of bridge device is a write blocker, which can include a blocking device that blocks certain commands (actually, such devices "filter" commands and can be referred to more accurately as "command-filtering" devices), such as read or write commands, as they are transmitted to a storage device by a host computer or the like. The command-filtering device is physically inserted between a host computer system and the storage device and is transparent to the host and the storage device. Write blockers (which also are command-filtering devices) allow acquisition of information stored on a drive, hard disk, etc. without allowing accidental or intentional damage to the contents of the drive/disk. Write blockers do this by allowing read commands to pass through to the protected disk, but blocking write commands, hence their name.

There are two types of write blockers, Native and Tailgate. A Native device communicates with the host computer system over the same type of interface used to communicate with the storage device, for example a IDE to IDE write block. A Tailgate device uses different types of interfaces for communication with the host computer system and with the storage device, for example a Firewire to SATA write block. The blocking device intercepts communications between the host and the storage device and examines any commands from the host to the storage device. Certain commands, such as commands that may modify the storage device, may be discarded.

Systems, methods and techniques that provide improved communication between a host computer and a bridge device or other, similar intermediate device would represent a significant advancement in the art.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. As one skilled in the art will appreciate, computer and other companies may refer to components by different names. This disclosure does not intend to distinguish between components that differ in name but not function. In the following discussion and in the claims, the terms "including" and "comprising" are used in an open-ended fashion, and thus should be interpreted to mean "including, but not limited to . . ." Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The term "system" refers broadly to a collection of two or more components and may be used to refer to an overall system (e.g., a computer system or a network of computers), a subsystem provided as part of a larger system (e.g., a subsystem within an individual computer), and/or a process or method pertaining to operation of such a system or subsystem.

Figure 1:
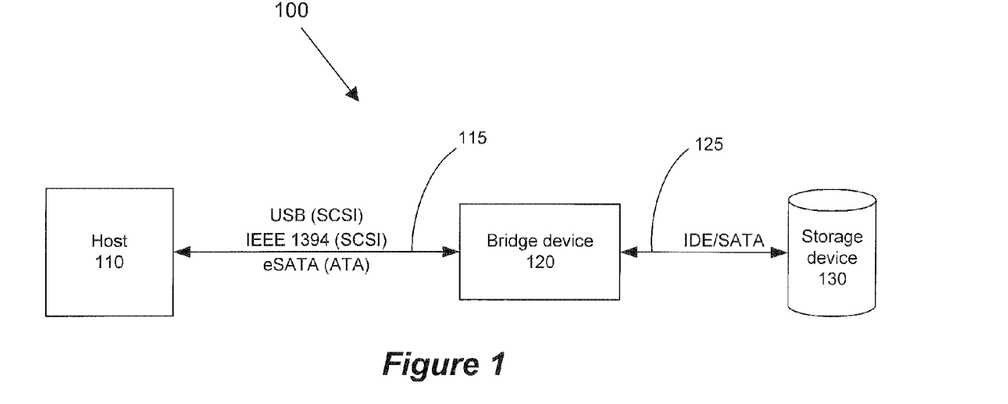
FIG. 1 is block diagram of a host computer coupled to a target device via a bridge device.
Figure 2:
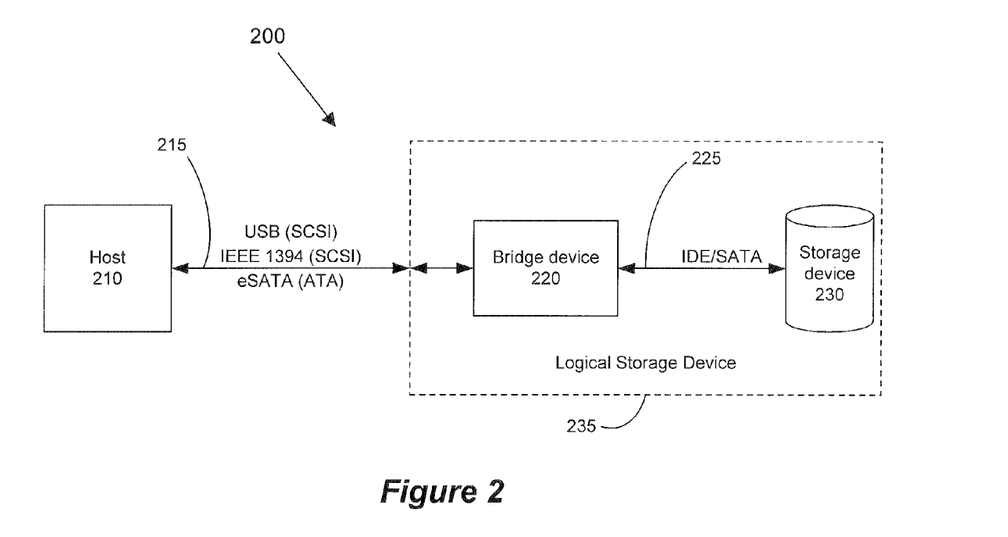
FIG. 2 is block diagram of a host computer coupled to a target device via a bridge device that is part of the target device generally.

As seen in FIG. 1, a host 110 (for example, a host computer or a computer CPU/motherboard) can be coupled to a disk or other storage device 130 via a bridge device 120. An interface 115 connects host 110 to bridge device 120. Similarly, an interface 125 connects the bridge device 120 to the storage device 130.

Bridge devices perform various functions. As noted above, one specialized type of bridge device is a command-filtering device (one type of which might be referred to as a "write blocker"), which filters certain commands and/or operations, such as read or write commands and/or operations, as they are transmitted to storage device 130 by a host computer 110 or the like. The command-filtering device typically is physically inserted between a host and the storage device and is transparent to the host and the storage device.

The storage device can be a long-term, non-volatile memory device, such as a block storage device or the like. For example, the storage device may be a hard disk drive, magnetic tape drive, optical disk drive, or flash memory. In one embodiment, interface 125 coupling the bridge device 120 to the storage device 130 is an Integrated Drive Electronics (IDE) interface. An IDE interface is a well-known electronic interface that is frequently used to connect a computer's motherboard to each disk drive in the computer. In IDE drives, the disk drive controller is built into the physical case of the disk drive. The IDE interface provides a relatively high level interface between the motherboard and the disk drive.

In other exemplary embodiments the host 110 may be a computer being used by a person conducting forensics investigation of the storage device 130. In such a case, the host 110 can be connected externally to the storage device 130. Again, an IDE or other appropriate interface 125 can be used to connect bridge device 120 to storage device 130.

Although some embodiments described herein may be disclosed in connection with an IDE magnetic hard disk drive, they are not limited to such drives. Other types of media can be implemented (such as flash memory with an IDE interface), as will be appreciated by those skilled in the art. Other types of media usable with an IDE interface include magnetic tape and optical media, such as a compact disc (CD) and a digital versatile disc (DVD). In addition to the IDE interface, concepts consistent with the invention may be applied in a straightforward manner to other types of high level storage interfaces, such as the well known Small Computer System Interface (SCSI) standard or a hard drive connected through an IEEE 1394 connection.

It often is desirable to be able to perform discovery and querying functions and the like with regard to a bridge device. In its standard mode of operation, a bridge device transparently emulates a storage device. Consequently, a host typically has no way to discover that bridge devices are present, and cannot interact with a bridge device in a fashion that is not supported by storage devices. This standard mode of operation of a bridge device is hereafter referred to as the bridge device's "locked" state.

In some cases, it may be possible to transmit a vendor-unique command to a bridge device using a storage device protocol (as will be appreciated by those skilled in the art, a bridge device can be programmed to respond to vendor-unique commands without consideration for locked/unlocked modes of operation). In such cases, crafting a set of vendor-unique commands for discovering and interacting with bridge devices is a straightforward task that can be performed readily by one skilled in the art. However, transmission of vendor-unique commands is not supported by all operating system drivers or by all storage device control hardware. In general, a bridge device access system can only rely upon support for a relatively limited set of standard commands designed purely for manipulation of storage devices. Embodiments disclosed herein take advantage of the relatively ubiquitous nature of the limited set of standard commands as proxies for unlocking and communicating with a bridge device in a bridge device access system. Such a bridge device access system according to one or more embodiments provided herein can be used to retrieve information (for example, identifying and/or operational state information) from or otherwise interact with a forensic bridge. An "unlock sequence" of communications from a host to the bridge device provides access to query capabilities over interfaces that do not support vendor-unique commands or the like that might otherwise be available.

As noted above, the default state of a typical forensic bridge is "locked." That is, all read/write/verify commands received by the bridge are interpreted as commands to be either write-blocked or passed through to the attached physical drive. Prior to querying the bridge directly, the bridge device is unlocked by sending the unlock sequence of commands to it.

Embodiments of a bridge device access system use dual-function or dual-purpose commands for unlocking and accessing a bridge device interposed between a host (for example, a computer) and a target device, for example a storage device. That is, commands are dual-purpose in the sense that each command is a valid command used by the host to communicate with the storage device, while concurrently providing a way for the host to communicate with an otherwise transparent bridge device between the host and the storage device. The commands thus function collaterally as a communications channel between host and bridge device.

In one embodiment, the unlock sequence consists of a series of seemingly otherwise routine "verify" commands. The host's verify commands are passed along by the bridge device to the storage device as they normally would, prompting a typical reply from the storage device. However, each verify command can also function in a proxy-type role when it is used as part of the unlock sequence. That is, in addition to its normal function, the verify command serves collaterally as a means for delivering the unlock sequence to the bridge device (perhaps viewed as an "alternate channel" for communicating between the host and the bridge device).

As will be appreciated by those skilled in the art, other types of commands and/or communications can be used. Verify commands are advantageous because they are relatively benign commands that are supported by a wide variety of storage device interfaces. The verify command instructs a storage device to examine a section of its physical media and determine whether or not that section can be read. Two pieces of information are used typically to perform a verify command—a "start address" and a "length parameter." The control circuit performing the verify command uses the start address in the storage device so that the control circuit knows where to look for the data to be verified. After verifying the first codeword, the verifying circuitry increments to the next address and performs verification on the data in the next address. The length parameter tells the circuit how long to perform the verification. That is, the length parameter tells the circuit how many addressable locations (for example, sectors) should be verified. Any valid sector is a valid starting address (invalid addresses are avoided in some embodiments to reduce problems and unnecessary use of resources in dealing with commands that generate problems for the storage device to handle). Modern hard drives typically have between $2^{25}$ and $2^{31}$ addressable sectors, but small devices (for example, flash drives) have many fewer sectors.

While a number of command types could be used to construct an unlock sequence, some bridge device applications require more care in sequence construction. For example, a forensic bridge device must not transmit commands to the attached storage device which would cause modifications to the stored data. Read commands and verify commands do not modify stored data, so both are acceptable for forensic applications.

In some embodiments, an unlock sequence in the bridge device access system comprises a stipulated number of verify commands using a pseudorandom sequence of values in the start address field of the verify commands. Verify commands are used in some embodiments because they are generally supported across a variety of storage interface protocols, do not require significant data transfer (the verify command response from the storage device to the host does not require transmission of a data "payload" by the storage device, as would a read command, for example), and save time and resources in the submission of an unlock sequence by a host to a bridge device. Limiting the length of each verify command to a single sector typically leads to improved performance, as the storage device control logic must read only a minimal portion of its physical media to satisfy such a command. Moreover, the unlock sequence can be made compatible with low-capacity storage devices by limiting the set of starting addresses to small values. In the examples provided below, the starting addresses all lie within the first 256 sectors; this choice is compatible with very small storage devices, yet provides a suitable degree of random potential to make the unlock sequence reasonably unique.

Figure 4:
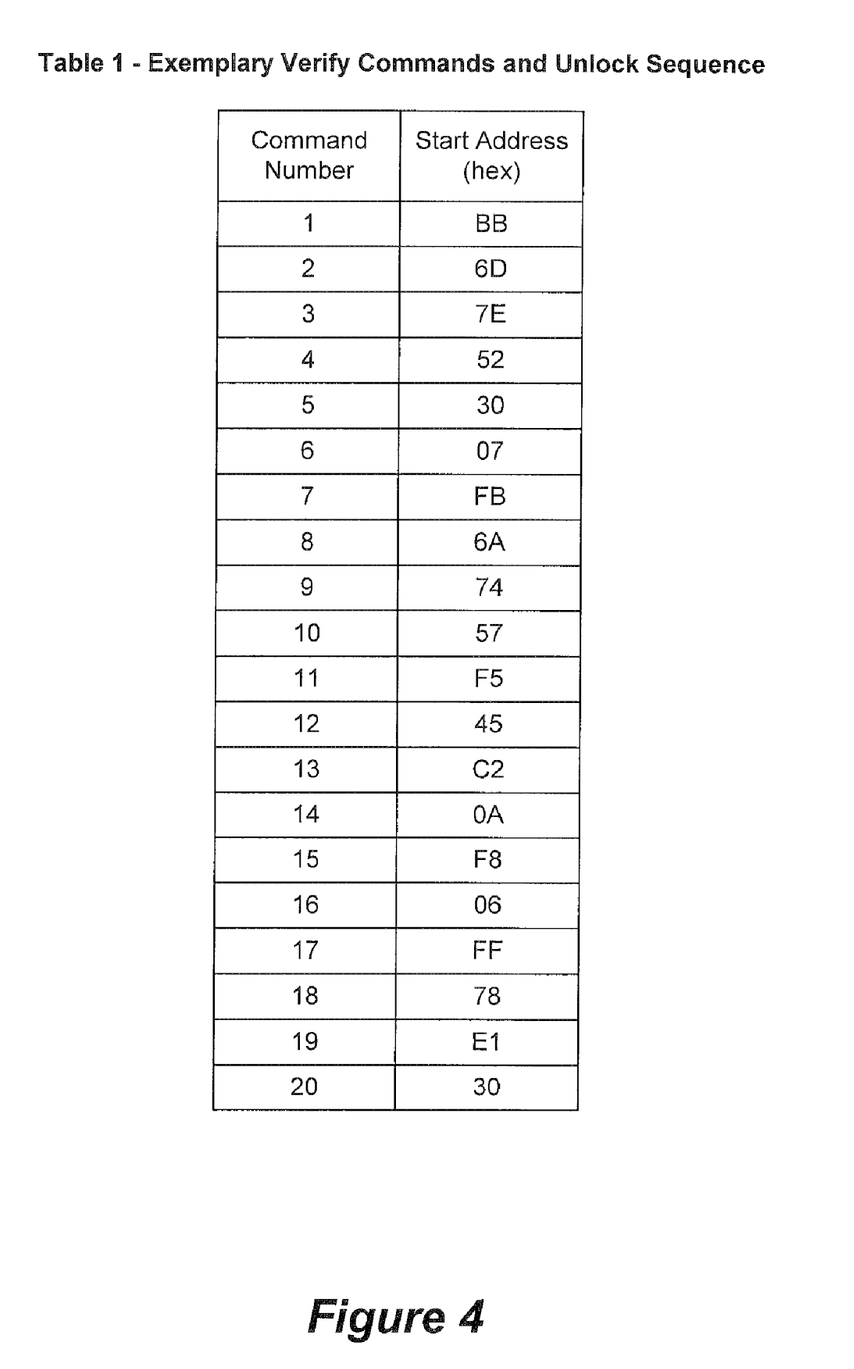
FIG. 4 includes Table 1, referred to in the Detailed Description.

The generally unique unlock sequence of values is seen by the bridge device as a "key" to unlock the bridge device. For example, as seen in Table 1 of FIG. 4, an exemplary unlock sequence of 20 one-sector verify commands can use a sequence of hexadecimal start addresses. The form of each verify command is specific to the storage device communication protocol being used. Generally, a verify command is of the following form:

VERIFY (start address, length)

Figure 5:
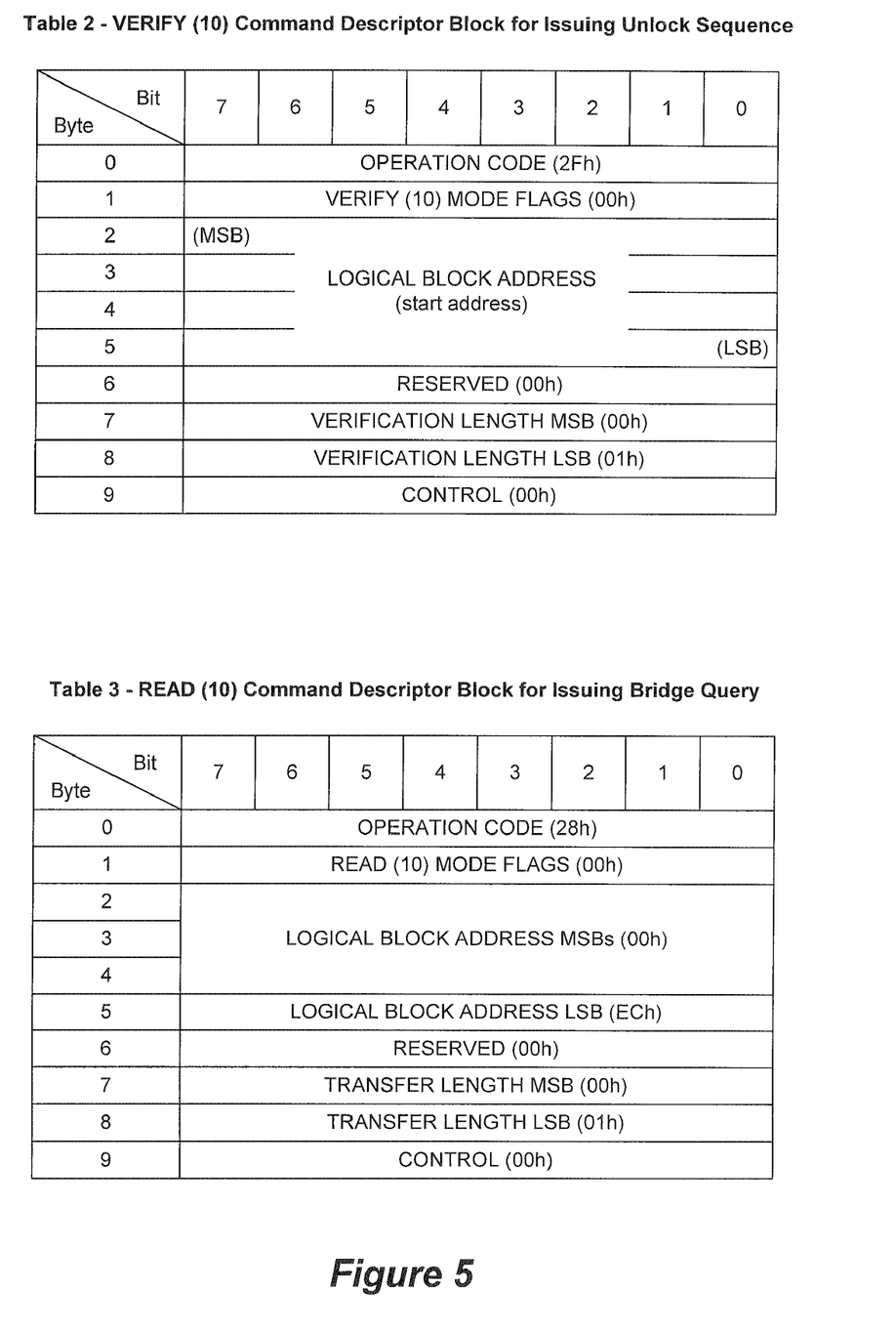
FIG. 5 includes Tables 2 and 3, referred to in the Detailed Description.

One example of a protocol-specific command suitable for an operating system using a SCSI abstraction layer to manage block devices is shown in Table 2 of FIG. 5. For such an operating system, a verify command can be constructed by formatting a SCSI VERIFY(10) command descriptor block.

Those skilled in the art will understand from this example how to construct and implement similar commands using other operating systems and command types. A command that includes a selectively variable field (for example, address, length, etc.) that is innocuous to the target device is suitable for use in connection with embodiments of the claimed bridge device access system. Those skilled in the art will appreciate that the commands do not all have to be of the same type, nor do they have to be verify or other innocuous commands, per se. For example, write commands and/or read commands can be used in lieu of the verify command embodiment discussed above. However, such write commands can pose risks to the storage device in certain settings (for example, forensics evaluation of the storage device relies on the static nature of data on the storage device subject to examination). Therefore, as will be appreciated by those skilled in the art, some care and consideration likely should be employed when selecting the type and content of commands used in the unlock sequence.

According to its standard operating process, a bridge device receiving a verify command such as the one shown in Table 2 will pass the verify command through the bridge device to the storage device, and will pass the storage device's command response back to the host. However, the bridge device also monitors commands from the host, looking for the unlock sequence. If the bridge does not receive the exact sequence of commands in the unlock sequence, the bridge device will remain "locked." Once the bridge device enters the "unlocked" state, the next command received will be treated as a potential bridge-access command, embodiments of which are discussed below. The bridge returns to the "locked" state immediately after processing the post-unlock sequence command.

Figure 3:
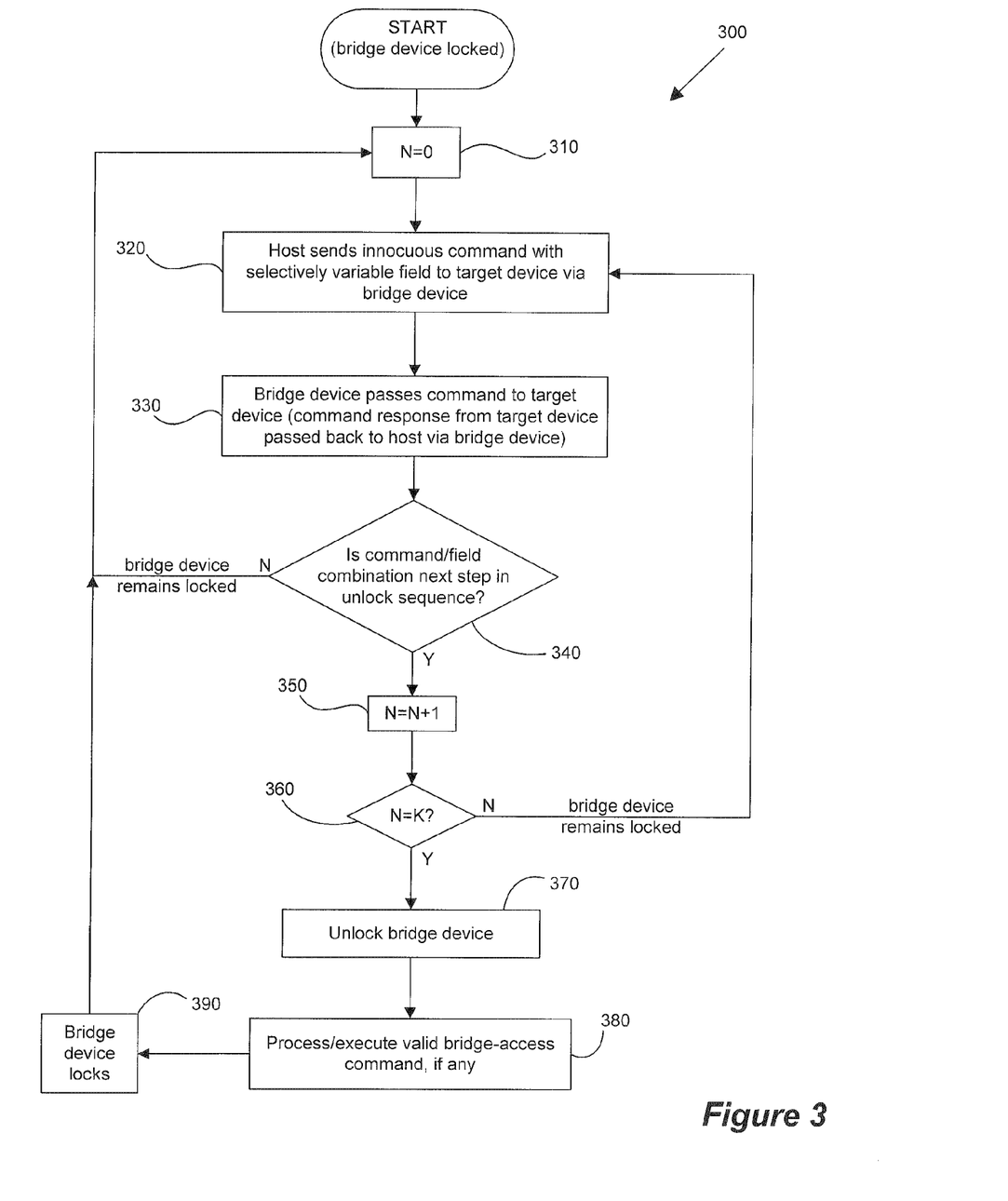
FIG. 3 is a flow diagram showing one or more methods of accessing a bridge device.

An exemplary process is shown in FIG. 3, where the process starts with the bridge device locked and a valid sequence command counter "N" set to 0. Some or all of the process illustrated in FIG. 3 and any methods and processes discussed herein can be embodied in a computer readable medium or other computer program product (such as mass storage device 808 of FIG. 8) that includes instructions which, when executed on a computer, a host, one or more processors, or on one or more other devices, operate to perform one or more of the methods and/or processes disclosed herein.

At 320 the host sends an innocuous command that includes a selectively variable field or value. This command is passed through to the target device at 330, and any command response from the target device to the host is likewise communicated. The bridge device inquires at 340 whether the command and field combination is the next step of a programmed unlock sequence. If not, the bridge device remains locked and the command counter N is reset. If the command/field combination is the next step in a valid unlock sequence, then the counter N is incremented at 350 and the bridge device determines at 360 whether the sufficient number of valid unlock sequence commands have been received. If not, then the process continues when the next command is sent by the host at 320. If the complete unlock sequence has been sent (that is, N reaches its limit K, which in Table 1 above is 20 verify commands providing the correct sequence of start address values), then the bridge device is unlocked at 370. Any valid bridge-access command that follows is processed and/or executed at 380 and the bridge device immediately locked thereafter at 390. The process is again reset with the counter N being set again to 0 at 310.

When the bridge has been "unlocked," if the next command is one of any number of valid bridge-access commands, the bridge device will respond to the host with a prescribed message, for example providing bridge identification or other information, or confirming performance of another function such as a diagnostic of the bridge device or target device. Examples of these bridge-access commands are provided below.

In one example, the bridge-access command can be a one-sector "read" of a prescribed address, for example:

READ (ECh, 1 sector)

The bridge intercepts this command and returns a one-sector payload containing bridge device information (for example, a prescribed set of query-response data). If the response length is less than one sector, the balance of the data payload can be zero-filled. Like the verify command, the form of a post-unlock sequence read command is storage device protocol-specific. Also, as with the use of verify commands in the unlock sequence, other command types, field values, etc. can be used for the bridge-access command(s), as will be appreciated by those skilled in the art. Again, the environment and restrictions in a given setting might make some command/field combinations preferable to others. However, again like the unlock sequence commands, the bridge-access commands can be commands that have an ostensible use in communications between the host and the storage device (for example, a read command or a verify command), while also functioning as a proxy or alternate communication means between the host and the bridge device.

For an operating system using a SCSI abstraction layer to manage block devices, an appropriate read command can be constructed by formatting a SCSI READ(10) command descriptor block as shown in Table 3 of FIG. 5. Such a bridge access command can be used to retrieve identifying information and operational state from a forensic bridge, such as those manufactured and sold by Tableau, LLC of Waukesha, Wis. An exemplary data exchange format is shown in Table 4 of FIG. 6 and Table 5 of FIG. 7.

Figure 6:
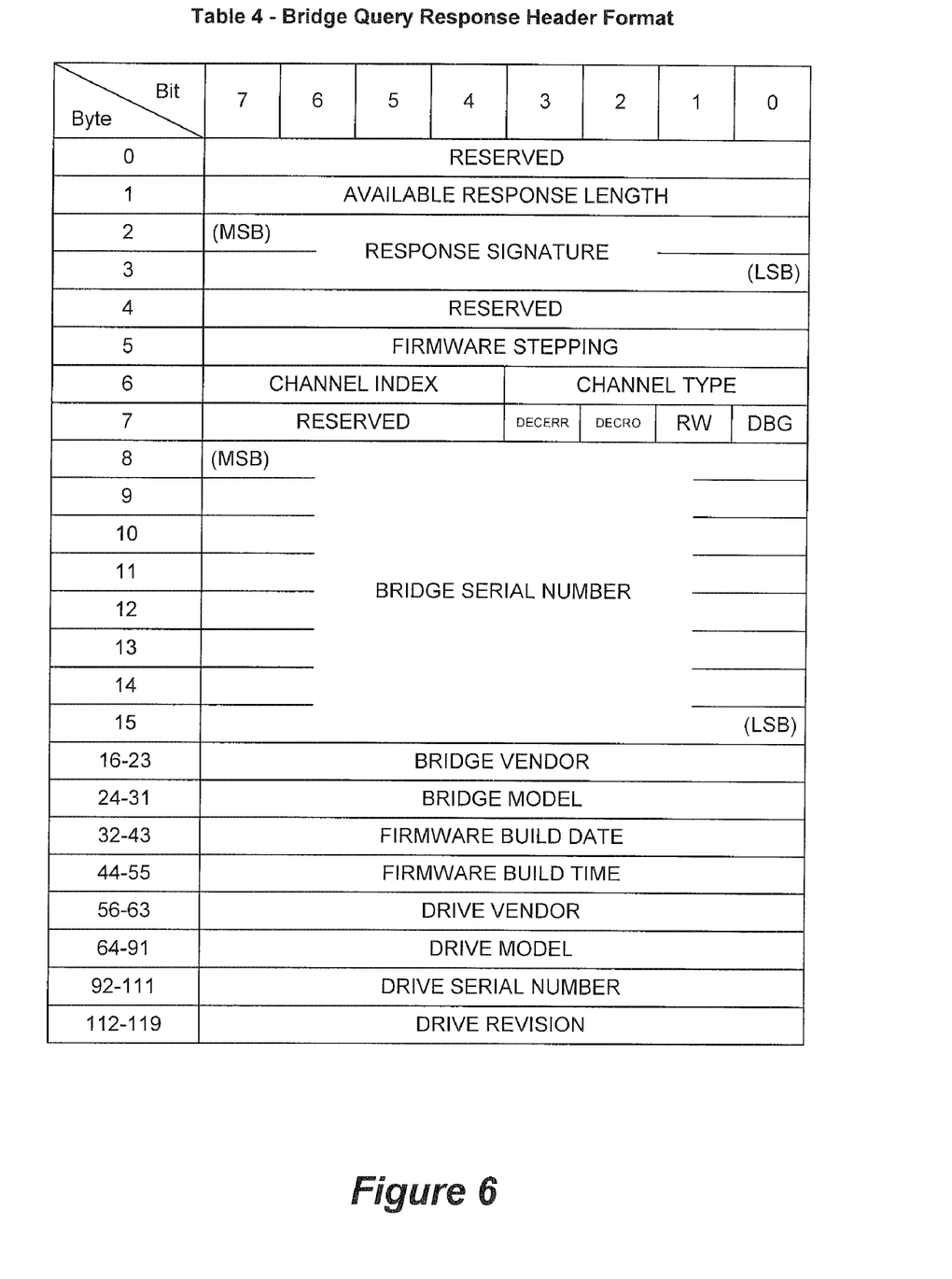
FIG. 6 includes Table 4, referred to in the Detailed Description.

The bridge query response begins with a common header which may be followed by zero or more optional pages. Information that can be returned by the bridge device within the common header can include one or more of the exemplary data types:

AVAILABLE RESPONSE LENGTH—The total length of response data which can be returned by the forensic bridge in its current operational state.

RESPONSE SIGNATURE—a 16-bit value which should be used by the host to validate the response data. The response data is valid when RESPONSE SIGNATURE equals 0ECCh.

FIRMWARE STEPPING—indicates the firmware stepping level of the forensic bridge. This value is not generally meaningful to third party developers.

CHANNEL TYPE—indicates the type of storage device interface currently in use as follows:

| Channel Type | |
|---|---|
| 0 | IDE |
| 1 | SATA |
| 2 | SCSI |
| 3 | USB |

When a forensic bridge supports more than one channel of a given type, CHANNEL INDEX specifies the index of the device interface channel currently in use. CHANNEL INDEX values begin with 0.

The DBG bit indicates whether the forensic bridge is running release (DBG=0) or debug (DBG=1) firmware.

The RW bit indicates whether the forensic bridge is in write-blocking mode (RW=0) or read/write mode (RW=1).

The DECRO bit indicates whether the forensic bridge declares its read-only (i.e., write-blocked) state to the host (DECRO=1) or whether this state is not declared (DECRO=0). This flag bit is meaningful only when the forensic bridge is in write-blocking mode.

The DECERR bit indicates whether the forensic bridge reports errors when write attempts are blocked (DECERR=1) or suppresses the error reporting (DECERR=0). This flag bit is meaningful only when the forensic bridge is in write-blocking mode.

BRIDGE SERIAL NUMBER—a 64-bit field which contains the unique serial number assigned to the forensic bridge. NOTE: This serial number is tied to the forensic bridge, not to a storage device which may be attached to the bridge.

BRIDGE VENDOR—an 8-byte string field containing the bridge vendor name in ASCII. Strings shorter than 8 characters are right-padded with ASCII spaces. Strings are not terminated with a NULL.

BRIDGE MODEL—an 8-byte string field containing the bridge model name in ASCII. Strings shorter than 8 characters are right-padded with ASCII spaces. Strings are not terminated with a NULL.

FIRMWARE BUILD DATE—a 12-byte string field containing the bridge firmware build date in ASCII (e.g., "Mar 30 2004"). Strings shorter than 12 characters are right-padded with ASCII spaces. Strings are not terminated with a NULL.

FIRMWARE BUILD TIME—a 12-byte string field containing the bridge firmware build time in ASCII (e.g., "12:34:29"). Strings shorter than 12 characters are right-padded with ASCII spaces. Strings are not terminated with a NULL.

DRIVE VENDOR—an 8-byte string field containing the storage device's vendor name in ASCII. Strings shorter than 8 characters are right-padded with ASCII spaces. Strings are not terminated with a NULL. NOTE: The DRIVE VENDOR field is returned only for certain models of forensic bridges (e.g., SCSI bridges). If the DRIVE VENDOR field is filled entirely with ASCII spaces, then the DRIVE MODEL field most likely contains vendor identifying information.

DRIVE MODEL—a 28-byte string field containing the storage device's model name in ASCII. Strings shorter than 28 characters are right-padded with ASCII spaces. Strings are not terminated with a NULL.

DRIVE SERIAL NUMBER—a 20-byte string field containing the storage device's serial number in ASCII. Strings shorter than 20 characters are right-padded with ASCII spaces. Strings are not terminated with a NULL. NOTE: The DRIVE SERIAL NUMBER is returned only when the ability to query the storage device's serial number is supported by the storage interface channel currently in use (e.g., IDE, SATA, and USB devices generally support unique serial numbers).

DRIVE REVISION—an 8-byte string field containing the storage device's revision level in ASCII. Strings shorter than 8 characters are right-padded with ASCII spaces. Strings are not terminated with a NULL.

The response data common header may be followed by zero or more additional information pages. An exemplary optional page, containing data specific to storage devices connected over ATA interfaces, is described in Table 5 of FIG. 7. This page is known as the "HPA/DCO Response Page," and contains information related to the HPA, DCO and Security feature sets described in the ATA specifications.

Figure 7:
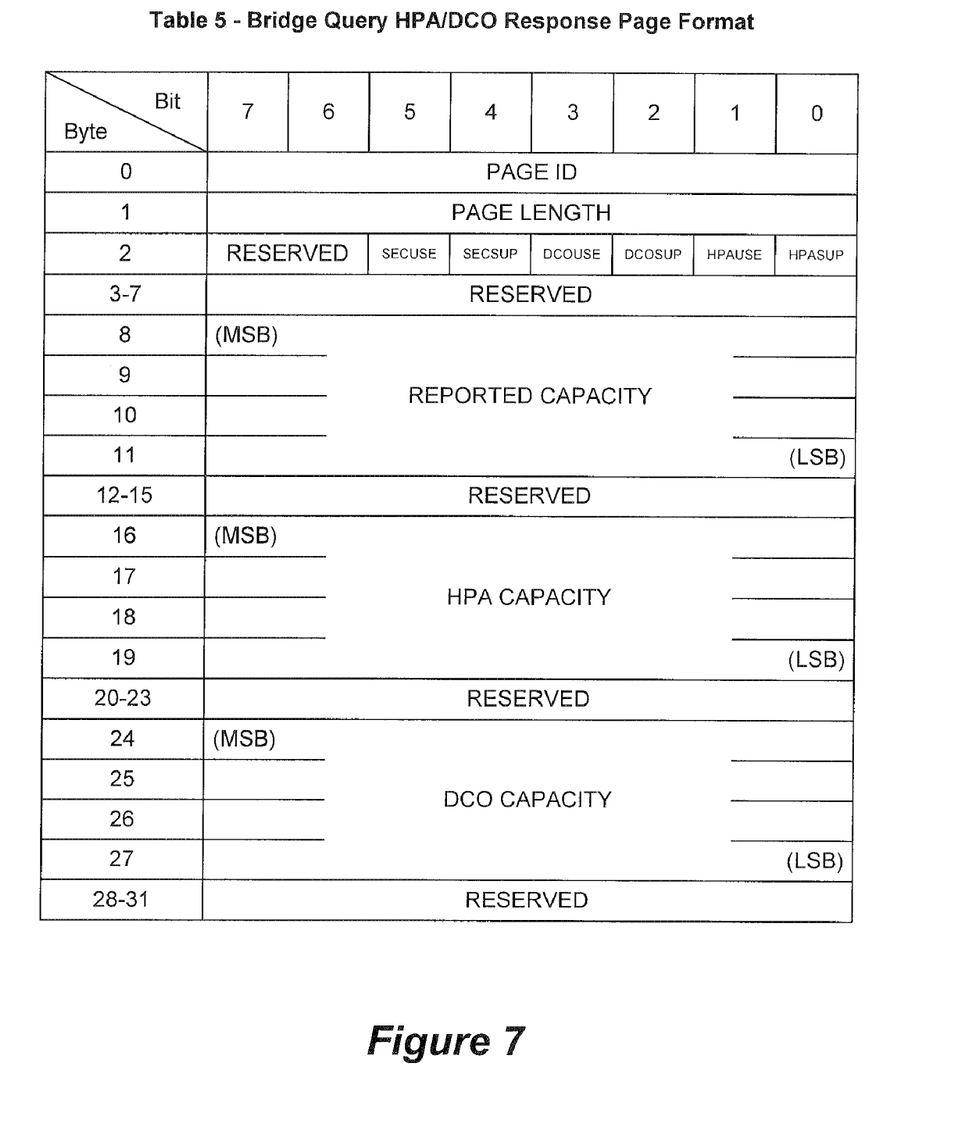
FIG. 7 includes Table 5, referred to in the Detailed Description.

For the HPA/DCO page, PAGE ID is 00h and the PAGE LENGTH is 20h.

HPASUP, DCOSUP, and SECSUP are set to 1 to indicate that the storage device supports the HPA, DCO, and Security feature sets, respectively. HPAUSE and DCOUSE are set to 1 to indicate that the forensic bridge has determined that HPA and/or DCO, respectively, has actually been used to reduce the apparent capacity of the storage device. SECUSE is set to 1 to indicate that the security feature set may currently be in use on the storage device.

REPORTED CAPACITY—the sector count reported by the attached storage device after power ON.

HPA CAPACITY—the sector count of the storage device as revealed by the HPA feature set.

DCO CAPACITY—the sector count of the storage device as revealed by the DCO feature set.

In another example, when the bridge has been placed in the "unlocked" state, if the next command is a one-sector "verify" command, for example:

VERIFY (ECh, 1 sector)

After processing such a command, a bridge that is attached to an ATA drive can attempt to send an "ATA DEVICE CONFIGURATION RESTORE" command to the drive. The "verify" command status returned to the host can indicate no error when the DEVICE CONFIGURATION RESTORE process was successful, and indicate an error when the process failed.

From the host software perspective, a successful DEVICE CONFIGURATION RESTORE operation is indistinguishable from a series of successful "verify" commands sent directly to a block storage device. The host software can resolve this ambiguity by first issuing a Bridge Query and examining the response to verify that a suitable forensic bridge responds.

As will be appreciated by those skilled in the art, other bridge-access commands can be constructed using the bridge device access system described and claimed herein. The bridge-access commands can be used to obtain information, control the bridge device and/or target device, perform configuration operations, perform diagnostic operations, etc.

Figure 8:
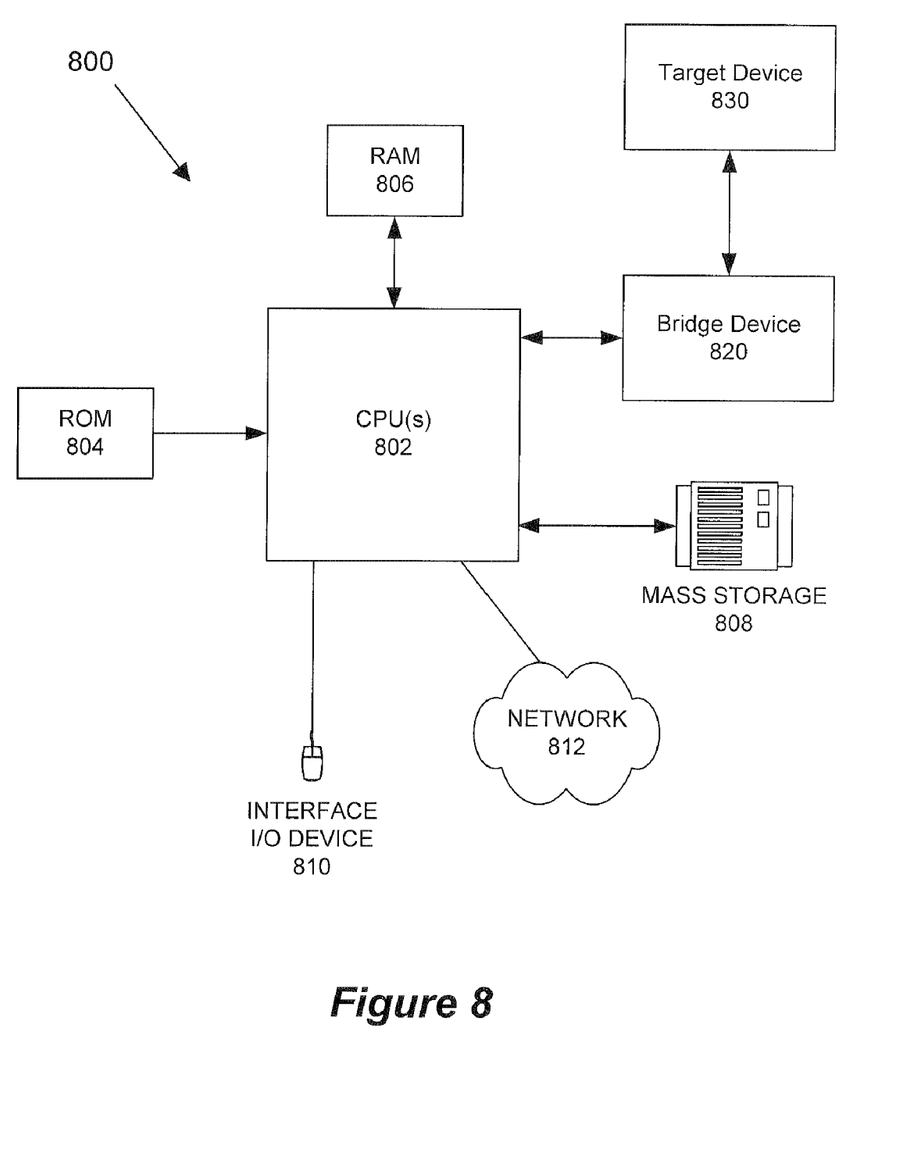
FIG. 8 is a block diagram of a typical computer system or integrated circuit system suitable for implementing embodiments of the present invention, including connection to one or more bridge devices and/or target devices according to one or more embodiments of the present invention.

FIG. 8 illustrates a typical computer system that can be used as a host computer and/or other component in a system in accordance with one or more embodiments of the present invention. For example, the computer system 800 of FIG. 8 can execute software and perform other functions, consistent with discussions herein in connection with embodiments of the present invention above. The computer system 800 includes any number of processors 802 (also referred to as central processing units, or CPUs) that are coupled to storage devices including storage 806 (typically a random access memory, or RAM), storage 804 (typically a read only memory, or ROM). The processor(s) 802 can run one or more operating systems that are well known in the art. As is also well known in the art, storage 804 acts to transfer data and instructions uni-directionally to the CPU and storage 806 is used typically to transfer data and instructions in a bi-directional manner. Both of these storage devices may include any suitable of the computer-readable media, other computer program products and the like. A mass storage device 808 also is coupled bi-directionally to CPU 802 and provides additional data storage capacity and may include one or more of the computer-readable media, other computer program products and the like. The mass storage device 808 may be used to store programs, data and the like and is typically a secondary storage medium such as a hard disk. It will be appreciated that the information retained within the mass storage device 808, may, in appropriate cases, be incorporated in standard fashion as part of primary storage 806 as virtual memory. A specific mass storage device such as a CD-ROM may also pass data uni-directionally to the CPU.

Exemplary CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Moreover, CPU 802 optionally may be coupled to a computer or telecommunications network using a network connection as shown generally at 812. With such a network connection, it is contemplated that the CPU might receive information from the network, or might output information to the network in the course of performing described method steps, for example where a network base station is in use. Finally, CPU 802, when it is part of a host computer or the like, may be coupled to a bridge device 820 according to one or more embodiments of the present invention and is used to access one or more target devices 830. The above-described devices and materials will be familiar to those of skill in the computer hardware and software arts. The hardware elements described above may define multiple software modules for performing the operations of this invention.

For example, instructions for running a data encryption cracking program, password breaking program, etc. may be stored on mass storage device 808 and executed on CPU 802 in conjunction with primary memory 806.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method for executing a bridge-access command in a bridge device coupled between a host computer and a storage device, the method comprising:
   providing the bridge device in a locked state;
   unlocking the bridge device, wherein unlocking the bridge device comprises sending an unlock sequence of storage device verify commands from the host computer to the bridge device, wherein each verify command comprises a start address and a length parameter, further wherein the sequence of start addresses in the sequence of storage device verify commands comprises a pseudorandom sequence of numeric values;
   the host computer sending the bridge-access command as the first command sent after the unlock sequence, the bridge-access command comprising one of the following:
   a one-sector read command; or
   a one-sector verify command; and
   the bridge device processing the bridge-access command and performing a prescribed operation in response to the bridge-access command.

2. The method of claim 1 wherein the bridge-access command further comprises a prescribed storage device sector address.

3. The method of claim 1 wherein the prescribed operation performed by the bridge device comprises the bridge device sending to the host computer information about one or more of the following:
   the bridge device; or
   the storage device.

4. The method of claim 1 wherein the prescribed operation performed by the bridge device comprises the bridge device sending an ATA DEVICE CONFIGURATION RESTORE command to the storage device.

5. The method of claim 4 wherein a verify command status is returned to the host and further wherein the status indicates no error when the ATA DEVICE CONFIGURATION RESTORE process was successful and indicates an error when the process failed.

6. The method of claim 1 further comprising the bridge device locking itself immediately after performing the prescribed operation in response to the bridge-access command.

7. The method of claim 1 wherein the bridge device is one of the following:
   a write blocker; or
   a command-filtering bridge.

8. The method of claim 7 wherein the bridge device is a forensic bridge device.

9. The method of claim 1 wherein the bridge device is transparent to the host computer when the bridge device is locked.

10. A method for retrieving identifying and operational state information from a bridge device coupled between a host computer and a target device, the method comprising:
   providing the bridge device in a locked state;
   unlocking the bridge device, wherein unlocking the bridge device comprises sending an unlock sequence of innocuous storage device commands from the host computer that are intercepted by the bridge device and are passed along to the storage device, wherein each innocuous command comprises a selectively variable first field, further wherein a sequence of values in the first field in consecutive innocuous commands of the unlock sequence of innocuous commands comprises a pseudorandom sequence of numeric values;
   querying the bridge device with a querying command that is the first command sent by the host computer to the bridge device following the unlock sequence; and
   the bridge device locking itself immediately following the querying command.

11. The method of claim 10 wherein the numeric values are interpreted as addresses corresponding to block storage addresses in the target device.

12. The method of claim 10 wherein each innocuous command in the unlock sequence is a verify command.

13. The method of claim 12 wherein the first field is a start address field.

14. A method for executing a command in a bridge device coupled between a host and a target device, the method comprising:
   providing the bridge device in a locked state;
   unlocking the bridge device using an unlock sequence of target device commands;
   the host sending a bridge-access command to the unlocked bridge device;
   the bridge device executing a prescribed operation in response to receiving the bridge-access command; and
   the bridge device locking itself immediately following the bridge-access command.

15. The method of claim 14 wherein the target device is a storage device;
   further wherein unlocking the bridge device comprises sending an unlock sequence of innocuous storage device commands from the host to the bridge device, wherein each innocuous command comprises a selectively variable first field, further wherein consecutive first field values in consecutive innocuous commands of the unlock sequence comprise a pseudorandom sequence of values.

16. A computer readable medium comprising instructions which, when executed on one or more processors, enable one or more devices to perform a method for executing a bridge-access command in a bridge device coupled between a host and a storage device, the method comprising:
   unlocking the bridge device, wherein unlocking the bridge device comprises the host sending an unlock sequence of innocuous storage device commands from the host to the bridge device, wherein each innocuous storage device command comprises an address value, further wherein the sequence of address values in the sequence of innocuous storage device commands comprises a pseudorandom sequence of numeric values; and
   the host sending the bridge-access command as the first command sent after the unlock sequence, the bridge-access command comprising an innocuous storage device command comprising one of the following:
   a read command; or
   a verify command;
   wherein the bridge device processes the bridge-access command and performs a prescribed operation in response to the bridge-access command.

* * * * *